(12) United States Patent
Ohno et al.

(10) Patent No.: US 7,553,531 B2
(45) Date of Patent: *Jun. 30, 2009

(54) HONEYCOMB STRUCTURE

(75) Inventors: Kazushige Ohno, Gifu (JP); Masafumi Kunieda, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 15 days.

This patent is subject to a terminal disclaimer.

(21) Appl. No.: 11/368,446

(22) Filed: Mar. 7, 2006

(65) Prior Publication Data
US 2006/0292338 A1 Dec. 28, 2006

(30) Foreign Application Priority Data
Jun. 24, 2005 (JP) ............... PCT/JP2005/011660

(51) Int. Cl.
*B32B 3/12* (2006.01)
*B32B 7/00* (2006.01)
(52) U.S. Cl. ..................... 428/116; 428/117
(58) Field of Classification Search ........... 428/116, 428/117, 119, 188, 913, 327; 501/118, 119, 501/154, 120, 153; 55/523, 529, 483, 502; 165/10
See application file for complete search history.

(56) References Cited

U.S. PATENT DOCUMENTS

| | | | | |
|---|---|---|---|---|
| 6,669,751 B1 * | 12/2003 | Ohno et al. | ................... | 55/523 |
| 2004/0097370 A1 | 5/2004 | Ichikawa et al. | | |
| 2005/0227869 A1 | 10/2005 | Ohno et al. | | |
| 2005/0247038 A1 * | 11/2005 | Takahashi | .................... | 55/523 |
| 2005/0266992 A1 | 12/2005 | Ohno et al. | | |
| 2006/0172113 A1 | 8/2006 | Kunieda | | |
| 2006/0177629 A1 | 8/2006 | Kunieda | | |

(Continued)

FOREIGN PATENT DOCUMENTS

DE 43 41 159 A1 8/1995

(Continued)

OTHER PUBLICATIONS

European Search Report.
U.S. Appl. No. 11/925,394.
U.S. Appl. No. 11/853,658.
U.S. Appl. No. 11/928,546.

*Primary Examiner*—Timothy M Speer
*Assistant Examiner*—Gordon R Baldwin
(74) *Attorney, Agent, or Firm*—Finnegan, Henderson, Farabow, Garrett & Dunner LLP

(57) ABSTRACT

A honeycomb structure is disclosed that includes plural honeycomb units bonded together by using a sealing material layer, each of the honeycomb units including plural throughholes separated by plural partition walls and provided in parallel along a longitudinal direction. Each of the honeycomb units includes at least ceramic particles, and inorganic fibers and/or whiskers; a cross sectional area of the honeycomb unit is from about 5 cm$^2$ to about 50 cm$^2$; and an outer surface of each honeycomb unit and the sealing material layer satisfy:

about $0.5 \leq \kappa/d \times (dc/\kappa c + df/\kappa f) \leq$ about 1, where, $\kappa f$ (W/mK) and $df$ (mm) represent a thermal conductivity and a thickness of the outer surface of the honeycomb units, respectively, $\kappa c$ (W/mK) and $dc$ (mm) represent a thermal conductivity and a thickness of the sealing material layer, respectively, and $\kappa$ (W/mK) and $d$ (mm) represent a thermal conductivity and a thickness of the combination of the outer surface and the sealing material layer.

9 Claims, 11 Drawing Sheets

U.S. PATENT DOCUMENTS

| | | |
|---|---|---|
| 2006/0292044 A1 | 12/2006 | Ohno et al. |
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2007/0004593 A1 | 1/2007 | Ohno et al. |
| 2007/0004592 A1 | 4/2007 | Ohno et al. |
| 2007/0077190 A1 | 4/2007 | Ohno et al. |

FOREIGN PATENT DOCUMENTS

| | | | |
|---|---|---|---|
| EP | 1249262 | * | 10/2002 |
| EP | 1 447 535 A1 | | 8/2004 |
| EP | 1 707 545 A1 | | 10/2006 |
| JP | 04042184 | * | 8/1992 |
| JP | 05-213681 | | 8/1993 |
| JP | 10-263416 | | 10/1998 |
| JP | 2000-102709 | | 4/2000 |
| WO | PCT/JP2005/021193 | | 11/2005 |
| WO | WO 2006/025283 A1 | | 3/2006 |
| WO | WO 2006/070540 A1 | | 7/2006 |

* cited by examiner

HONEYCOMB STRUCTURE

BACKGROUND OF THE INVENTION

1. Field of the Invention

The present invention relates to a honeycomb structure.

2. Description of the Related Art

Generally, a honeycomb catalyst, which is used for conversion of exhaust gas from vehicles, is fabricated by disposing materials of a high specific surface area like active alumina and catalysts like platinum on the surface of a monolithic cordierite-based honeycomb structure having a low thermal expansion characteristic. In addition, the honeycomb catalyst carries an alkali-earth metal like barium to act as an occlusion-type NOx catalyst for a NOx processing in an oxygen-rich atmosphere, such as atmospheres in a lean-burn engine or a Diesel engine.

In order to further improve conversion performance, it is necessary to increase the contact probability between the exhaust gas and the catalyst element and the NOx occlusion agent as well. For this purpose, it is required to increase the specific surface area of the carrier, decrease diameters of catalyst elements and highly disperse the catalyst elements. However, if simply increasing the amount of the materials of high specific surface areas like active alumina, it is the thickness of the active alumina layer only that is increased, and it does not lead to an increase of the contact probability, but results in a pressure loss. For this reason, modifications have been made on cell shapes, cell densities, wall thicknesses, and so on. For example, see JP-A 10-263416 (below, referred to as "reference 1").

On the other hand, a honeycomb structure formed from materials of high specific surface areas is known to be formed by extrusion molding of the materials of high specific surface areas together with inorganic fibers and inorganic binders. For example, see JP-A 5-213681 (below, referred to as "reference 2").

Further, a honeycomb structure is known, which is obtained by bonding honeycomb units with an adhesive agent in order to increase the size of the above honeycomb structure. For example, see DE 4341159A1 (below, referred to as "reference 3").

Additionally, the entire contents of JP-A 10-263416, JP-A 5-213681, and DE 4341159A1 are hereby incorporated by reference.

SUMMARY OF THE INVENTION

An embodiment of the present invention provides a honeycomb structure including a plurality of honeycomb units bonded together by using a sealing material layer, each of the honeycomb units including a plurality of through-holes separated by a plurality of partition walls and provided in parallel along a longitudinal direction of the honeycomb units, wherein each of the honeycomb units includes at least ceramic particles, and inorganic fibers and/or whiskers; an area of a cross section of each of the honeycomb units perpendicular to the longitudinal direction of the honeycomb unit is greater than or equal to about 5 cm$^2$ and less than or equal to about 50 cm$^2$; and an outer surface of each of the honeycomb units and the sealing material layer satisfy:

$$\text{about } 0.5 \leq \kappa/d \times (dc/\kappa c + df/\kappa f) \leq \text{about } 1$$

where, $\kappa f$ (W/mK) represents a thermal conductivity of the outer surface of each of the honeycomb units, and df (mm) represents a thickness of the outer surface of each of the honeycomb units, $\kappa c$ (W/mK) represents a thermal conductivity of the sealing material layer, and dc (mm) represents a thickness of the sealing material layer, and $\kappa$ (W/mK) represents a thermal conductivity of a combination of the outer surface and the sealing material layer, and d (mm) represents a thickness of the combined layer including the outer surface and the sealing material layer.

In addition, in the honeycomb structure, preferably a ratio of a sum of areas of the cross sections of the honeycomb units perpendicular to the longitudinal direction of the honeycomb units to an area of a cross section of the honeycomb structure perpendicular to the longitudinal direction of the honeycomb structure is greater than or equal to about 85%.

In addition, in the honeycomb structure, preferably a coating material layer is provided on an outer surface of the honeycomb structure.

In addition, in the honeycomb structure, preferably the ceramic particles include one or more selected from a group of alumina, silica, zirconia, titanium, cerium, mullite, and zeolite.

In addition, in the honeycomb structure, preferably the inorganic fibers and/or the whisker includes one or more selected from a group of alumina, silica, silicon carbide, silica alumina, glass, potassium titanate, and aluminum borate.

In addition, in the honeycomb structure, preferably each of the honeycomb units is formed from a mixture of the ceramic particles, the inorganic fibers and/or the whisker, and an inorganic binder, and the inorganic binder includes one or more selected from a group of alumina sol, silica sol, titanium sol, soluble glass, sepiolite, and attapulgite.

In addition, preferably the honeycomb structure carries catalyst elements.

In addition, in the honeycomb structure, preferably the catalyst elements include one or more of a noble metal, an alkali metal, an alkali-earth metal, and an oxide.

In addition, preferably, the honeycomb structure is used to convert exhaust gas from a vehicle.

These and other objects, features, and advantages of the present invention will become more apparent from the following detailed description of preferred embodiments given with reference to the accompanying drawings.

DESCRIPTION OF THE PREFERRED EMBODIMENTS

Below, embodiments of the present invention are explained with reference to the accompanying drawings.

Figure 1A:
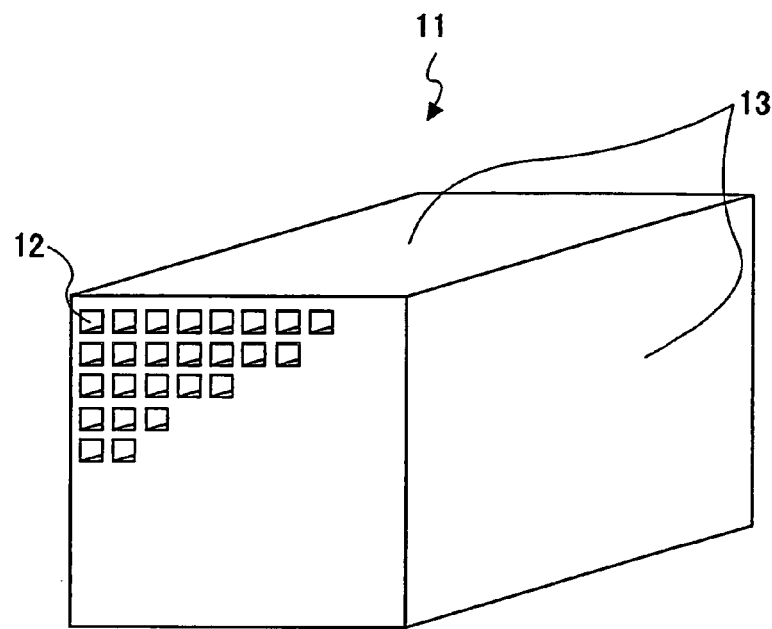
FIG. 1A is a schematic view of honeycomb units of the present invention.
Figure 1B:
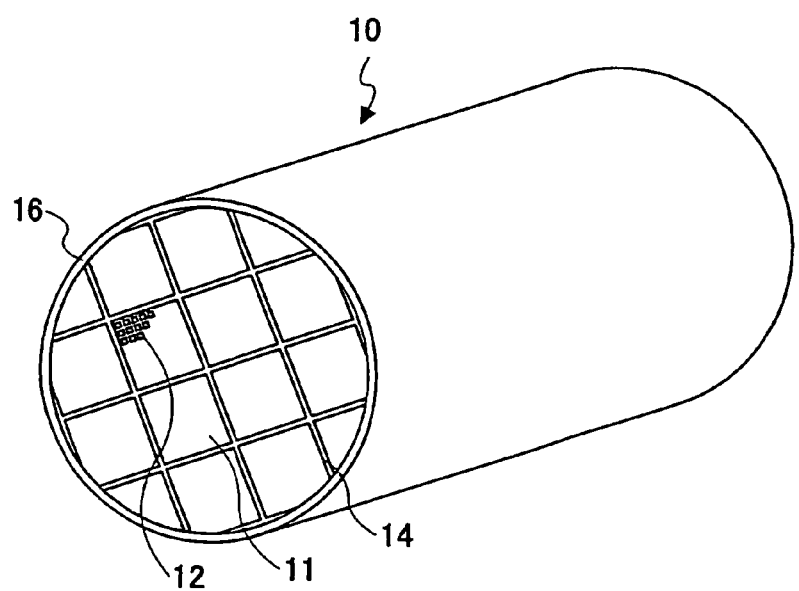
FIG. 1B is a schematic view of a honeycomb structure of the present invention.

As illustrated in FIG. 1A and FIG. 1B, a honeycomb structure 10 of the present invention includes plural honeycomb units 11 bonded together by using a sealing material layer 14, each of the honeycomb units including plural through-holes 12 separated by plural partition walls and provided in parallel along a longitudinal direction of the honeycomb units 11. Each of the honeycomb units 11 includes at least ceramic particles, inorganic fibers, or whisker, and an area of a cross section of one of the honeycomb units perpendicular to the longitudinal direction of the one of the honeycomb units is greater than or equal to about 5 cm² and less than or equal to about 50 cm², and an outer surface 13 of the honeycomb unit 11 and the sealing material layer 14 satisfy:

about $0.5 \leq \kappa/d \times (dc/\kappa c + df/\kappa f) \leq$ about 1 where, $\kappa f$ (W/mK) represents a thermal conductivity of the outer surface 13 of the honeycomb unit 11, and df (mm) represents a thickness of the outer surface 13 of the honeycomb unit 11, $\kappa c$ (W/mK) represents a thermal conductivity of the sealing material layer 14, and dc (mm) represents a thickness of the sealing material layer 14, and $\kappa$ (W/mK) represents a thermal conductivity of a combination of the outer surface 13 and the sealing material layer 14, and d (mm) represents a thickness of the combination of the outer surface 13 and the sealing material layer 14.

In the above honeycomb structure 10, because plural honeycomb units are bonded together by using the sealing material layer 14, it is possible to improve the resistance against thermal shock and vibration. It is considered that this is because temperature differences between honeycomb units can be suppressed to be small even when a temperature distribution is generated in the honeycomb structure 10 due to a rapid temperature change. Alternatively, this is because the sealing material layer 14 is able to attenuate the thermal shock and vibration.

In addition, even when cracks occur in the honeycomb units because of thermal stress, the sealing material layer 14 is able to prevent the cracks from propagating throughout the whole honeycomb structure. Further, the sealing material layer 14 also functions as a frame of the honeycomb structure to maintain the shape of the honeycomb structure so as not to lose the function of a catalyst carrier.

When the area of a cross section of one honeycomb unit perpendicular to the longitudinal direction is less than about 5 cm² (or a cross section of one honeycomb unit perpendicular to the through-holes) (below, the area of such a cross section is simply referred to as "cross sectional area"), the ratio of the sealing material layer 14, which seal the honeycomb units, becomes high, thus, the specific surface area decreases, and the pressure loss increases. In the meantime, when the cross sectional area is greater than about 50 cm², the honeycomb units become large, and it becomes difficult to attenuate the thermal stress in each of the honeycomb units.

Therefore, preferably, with the cross sectional area of the honeycomb unit being in the range from about 5 to about 50 cm², it is possible to reduce the pressure loss, maintain sufficient strength against the thermal stress, while maintaining a large specific surface, and obtain high durability, and reach a practical use level.

According to the honeycomb structure of the present invention, it is possible to highly disperse the catalyst elements and improve resistance against thermal shock and vibration.

Here, when the honeycomb structure includes plural honeycomb units each having different cross sectional area, the term "cross sectional area" means the cross sectional area of each honeycomb unit, which is the basic unit constituting the honeycomb structure, and usually, means the maximum cross sectional area of the honeycomb unit.

Figure 2:
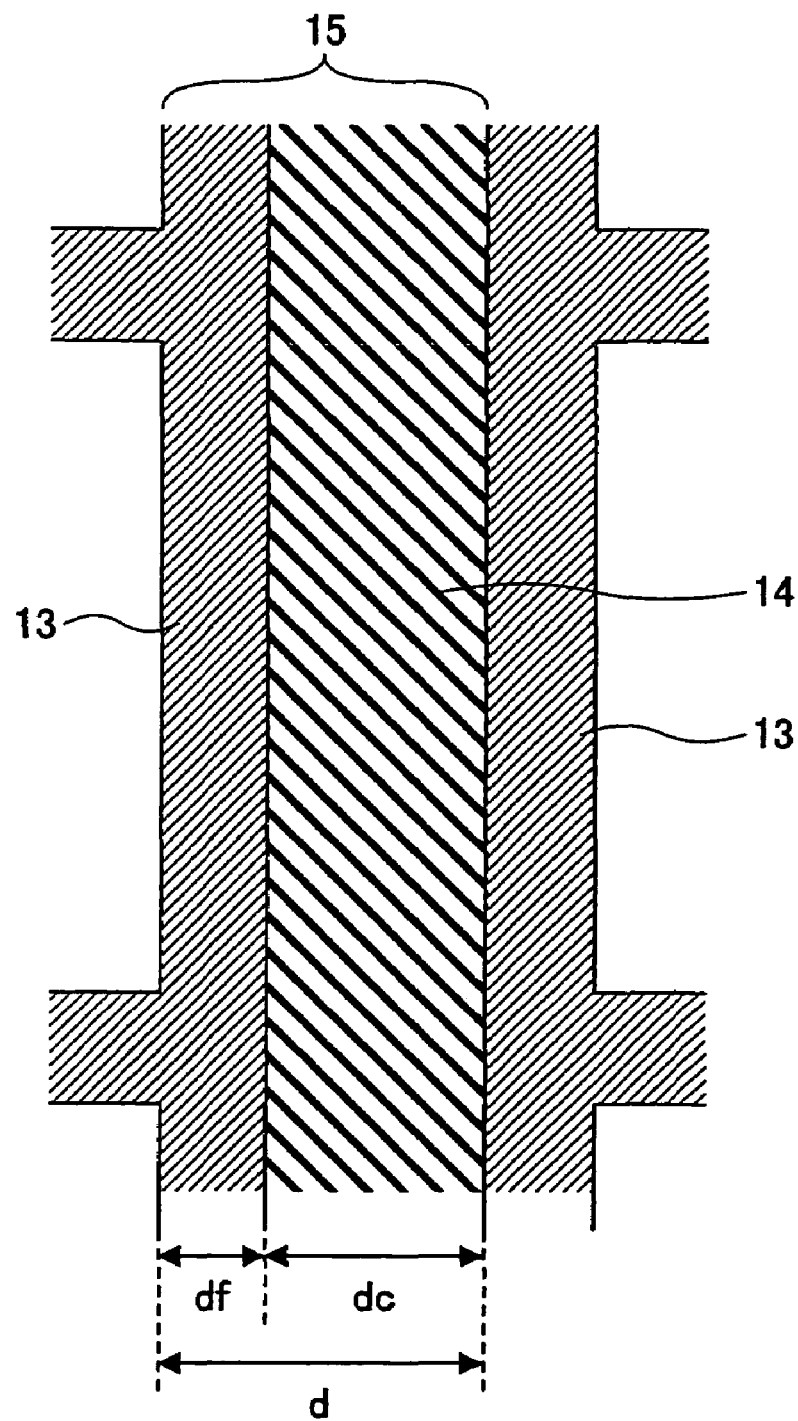
FIG. 2 is an enlarged cross sectional view of the honeycomb structure shown in FIG. 1B.

In the honeycomb structure of the present invention, as shown in FIG. 2, the outer surface 13 of the honeycomb unit 11 and the sealing material layer 14 satisfy the equation:

about $0.5 \leq \kappa/d \times (dc/\kappa c + df/\kappa f) \leq$ about 1 where, $\kappa f$ (W/mK) represents the thermal conductivity of the outer surface 13 of the honeycomb unit 11, and df (mm) represents the thickness of the outer surface 13 of the honeycomb unit 11, $\kappa c$ (W/mK) represents the thermal conductivity of the sealing material layer 14, and dc (mm) represents the thickness of the sealing material layer 14, and $\kappa$ (W/mK) represents the thermal conductivity of the combination of the outer surface 13 and the sealing material layer 14, and d (mm) represents the thickness of the combination of the outer surface 13 and the sealing material layer 14.

Here, $\kappa f$, $\kappa c$, and $\kappa f$ represent the respective thermal conductivities in the thickness direction.

The thickness d (mm) of the combination of the outer surface 13 and the sealing material layer 14 equals df+dc. The thermal conductivity $\kappa$ (W/mK) of the combination of the outer surface 13 and the sealing material layer 14 is expressed as follow:

$\kappa/d = X/(dc/\kappa c + df/\kappa f)$ where, X indicates a ratio of thermal transmission at the interface. When X is one, it implies that the heat is transmitted without a loss due to a heat resistance at the interface. When X is zero, it implies that heat is completed shielded at the interface. If X is less than about 0.5, regardless of the value of the thermal conductivity of the sealing material layer 14, the heat resistance at the interface increases, the temperature distribution in the honeycomb structure becomes non-uniform, and cracks may occur in the honeycomb structure because of thermal stress. Therefore, it is preferable that X is greater than or equal to about 0.5, more preferably, greater than or equal to about 0.6, still more preferably, greater than or equal to about 0.7. Under this condition, the heat can be transmitted smoothly between the honeycomb units, and the temperature distribution in the honeycomb structure becomes uniform. Further, as described below, when the honeycomb structure is used as a catalyst carrier for converting exhaust gas from vehicles, and is arranged in front of the DPF, the heat produced in exothermic reactions can be transmitted to the DPF efficiently, and this improves the regeneration efficiency of the DPF.

In the honeycomb structure of the present invention, it is described that the combined layer of the outer surface 13 and the sealing material layer 14 satisfy the equation:

about $0.5 \leq \kappa/d \times (dc/\kappa c + df/\kappa f) \leq$ about 1.

Preferably, the combined layer of the sealing material layer 14 and either of the outer surfaces 13 on the two sides of the sealing material layer 14 satisfy this equation. In addition, it is preferable that about 50% or more in volume of the combined layer of the outer surface 13 and the sealing material layer 14 satisfy the equation; more preferably, about 60% or more in volume of the combined layer of the outer surface 13 and the sealing material layer 14 satisfy the equation; still more preferably, about 70% or more in volume of the combined layer of the outer surface 13 and the sealing material layer 14 satisfy the equation.

In addition, preferably, a ratio of a sum of the cross sectional areas of the honeycomb units to the cross sectional area of the honeycomb structure is greater than or equal to about 85%, more preferably, greater than or equal to about 90%.

If the ratio is greater than or equal to about 85%, the ratio of the sealing material layer 14 lowers, the ratio of the honeycomb units increases, and thus, the specific surface area increases and the pressure loss lowers. If the ratio is higher than about 90%, the pressure loss can be reduced.

The honeycomb structure 10 of the present invention, as illustrated in FIG. 1B, includes plural honeycomb units 11 bonded together by the sealing material layer 14, and the outer surface of the honeycomb structure without throughholes may be covered by a coating material layer 16. Due to this, the outer surface can be protected and to improve the strength of the honeycomb structure.

There is no limitation on the shape of the honeycomb structure obtained by bonding plural honeycomb units 11 together, and it can be of any shape and any size. For example, the honeycomb structure may be cylindrical, a rectangular pillar, or a cylindroid.

In the honeycomb structure 10 of the present invention, the honeycomb unit may include inorganic fibers and/or whisker, hence it is possible to improve the strength of the honeycomb unit. Preferably, the aspect ratio (length/width) of the inorganic fibers and/or whiskers is from about 2 to about 1000, more preferably, from about 5 to about 800, still more preferably, from about 10 to about 500. When the aspect ratio of the inorganic fibers and/or whiskers is greater than or equal to about 2, the contribution to the strength of the honeycomb structure is large; when the aspect ratio of the inorganic fibers and/or the whiskers is less than about 1000, during molding, clogging can hardly occur in the mold, and it is easy to perform molding. In addition, during extrusion molding, the inorganic fibers and/or the whiskers can hardly be bent, making their lengths uniform, and this may increase the contribution to the strength of the honeycomb structure. Here, when the aspect ratio of the inorganic fibers and/or whiskers has a distribution, the average value of the distribution may be used in the above discussion.

There is no limitation on the inorganic fibers and/or the whiskers, preferably, the inorganic fibers and/or the whiskers may be one or more selected from a group of alumina, silica, silicon carbide, silica alumina, glass, potassium titanate, and aluminum borate.

Preferably, the concentration of the inorganic fibers and/or the whiskers included in the honeycomb structure is from about 3% to about 70% in weight, more preferably from about 3% to about 50% in weight, still more preferably, from about 5% to about 40% in weight, and yet more preferably, from about 8% to about 30% in weight. When the concentration of the inorganic fibers and/or the whiskers is greater than about 3% in weight, the percentage of the inorganic fibers and/or the whiskers, which contribute to the strength, is large; hence, the strength of the honeycomb structure does not decrease. When the concentration of the inorganic fibers and/or the whiskers is less than about 50% in weight, the percentage of the ceramic particles, which particles contribute to the specific surface area, is large, and the specific surface area of the honeycomb structure increases; as a result, when carrying the catalyst elements, the catalyst elements can be well dispersed easily.

In the honeycomb structure 10 of the present invention, the honeycomb unit may include ceramic particles, and this improves the specific surface area of the honeycomb structure.

There is no limitation on the ceramic particles. For example, it is preferable to use one or more selected from a group of alumina, silica, zirconia, titanium, cerium, mullite, and zeolite. It is more preferable to use alumina.

Preferably, the concentration of the ceramic particles included in the honeycomb structure is from about 30% to about 97% in weight, more preferably, from about 30% to about 90% in weight, still more preferably, from about 40% to about 80% in weight, yet more preferably, from about 50% to about 75% in weight. When the concentration of the ceramic particles is greater than about 30% in weight, the percentage of the ceramic particles, which contribute to the specific surface area, is large, and the specific surface area of the honeycomb structure increases; as a result, when carrying the catalyst elements, the catalyst elements can be well dispersed easily. Meanwhile, when the concentration of the ceramic particles is lower than about 97% in weight, the percentage of the inorganic fibers, which contribute to the strength, is large; as a result, the strength of the honeycomb structure does not decrease.

In the honeycomb structure 10 of the present invention, the honeycomb unit may be formed from a mixture of ceramic particles, inorganic fibers and/or whiskers, and an inorganic binder. Due to this, it is possible to obtain sufficient strength even at a low firing temperature of the honeycomb units.

There is no limitation on the inorganic binder. For example, the inorganic binder may be an inorganic sol, or a clay sol. Specifically, the inorganic sol may be an alumina sol, silica sol, titanium sol, or soluble glass. The clay sol may be a china clay, kaolin, montmorillonite, multiple chain structure clay such as sepiolite, or attapulgite. One or more of these inorganic sols and clay sols may be mixed for use.

Preferably, the concentration of the inorganic binders included in the honeycomb structure is less than about 50% in weight, more preferably, from about 5% to about 50% in weight, still more preferably, from about 10% to about 40% in weight, and yet still more preferably, from about 15% to about 35% in weight. When the concentration of the inorganic binders is less than or equal to about 50% in weight, it is easy to perform molding.

There is no limitation on the shape of the honeycomb units, but it is preferable to use shapes facilitating bonding of the honeycomb units. For example, a cross section of the honeycomb unit may be a square, or rectangle, or a sector.

FIG. 1A illustrates an example of the honeycomb unit 11, which is a rectangular solid having a square cross section. The honeycomb unit 11 includes plural through-holes 12 arranged in parallel from the front side to the back side, and outer side walls 13 without the through-holes.

There is no limitation on the wall thickness between the through-holes 12. Preferably, the wall thickness between the through-holes 12 is from about 0.05 to about 0.35 mm, more preferably, from about 0.10 to about 0.30 mm, still more preferably, from about 0.15 to about 0.25 mm. When the wall thickness between the through-holes 12 is greater than or equal to about 0.05 mm, the strength of the honeycomb unit increases; when the wall thickness between the through-holes 12 is less than about 0.35 mm, the area where the honeycomb unit can contact the exhaust gas increase, and the exhaust gas can easily infiltrate into the partition wall sufficiently, thus, the exhaust gas can easily contact the catalyst elements carried in the inner portion of the partition wall, as a result, the catalyst performance does not decline.

In addition, it is preferable that the number of the through-holes 12 per unit cross-sectional area be from about 15.5 to about 186/cm$^2$ (from about 100 to about 1200 cpsi), more preferably, from about 46.5 to about 170.5/cm$^2$ (from about 300 to about 1100 cpsi), and still more preferably, from about 62.0 to about 155/cm$^2$ (from about 400 to about 1000 cpsi). When the number of the through-holes 12 per unit cross-sectional area is greater than or equal to about 15.5, the area of the inner wall contacting the exhaust gas in the honeycomb units 11 is large, and when the number of the through-holes 12 per unit cross-sectional area is less than or equal to about 186, the pressure loss does not increase, and it becomes easy to fabricate the honeycomb units 11.

There is no limitation on the shape of the through-holes 12 of the honeycomb units 11. For example, the cross section of the through-holes 12 may approximately be a triangle or a hexagon.

Preferably, the cross sectional area of the honeycomb unit 11 is from about 5 to about 50 cm$^2$, more preferably, from about 6 to about 40 cm$^2$, and still more preferably, from about 8 to about 30 cm$^2$. Due to this, it is possible to maintain the specific-surface-area of the honeycomb structure to be large, highly disperse the catalyst elements, and maintain the shape of the honeycomb structure even when external forces like thermal shock and vibration are imposed.

According to the present embodiment, it is possible to increase the specific surface area of the carrier, decrease diameters of catalyst elements and highly disperse the catalyst elements, thus it is possible to increase the contact probability between the exhaust gas and the catalyst element and the NOx occlusion agent, and to further improve conversion performance.

In addition, it is possible to maintain the strength of the honeycomb structure, and it is easy to maintain the shape of the honeycomb structure to function as a catalyst carrier.

In addition, it is possible to increase regeneration efficiency of a Diesel particulate filter (DPF) for converting exhaust gas from a Diesel engine.

Next, descriptions are made of a method of fabricating the honeycomb structure of the present invention. First, extrusion molding is performed by using a raw material paste with the above-mentioned ceramic particles, the inorganic fibers and/or whiskers, and the inorganic binder as main ingredients, thereby forming a honeycomb unit molding piece. In the raw material paste, in addition to the above materials, an organic binder, a dispersive medium, and a molding agent may be added when necessary according to the moldability.

There is no limitation on the organic binders. For example, the organic binders may be one or more selected from a group of methylcellulose, carboxymethylcellulose, hydroxyethylcellulose, polyethylene glycol, phenolic resin, and epoxy resin. Preferably, the composition of the organic binders is about 1 to about 10 parts by weight (w/t part) assuming the total weight of the ceramic particles, the inorganic fibers and/or whiskers, and the inorganic binders is about 100 parts by weight (w/t part).

There is no limitation on the dispersive medium. For example, the dispersive medium may be water, organic solvent (like benzene), alcohol (like methanol), or others.

There is no limitation on the molding agent; for example, the molding agent may be ethylene glycol, dextrin, aliphatic acid, fatty acid soap, polyalcohol, or others.

There is no limitation on the method of forming the raw material paste. For example, mixing and kneading are preferable. For example, a mixer or an agitator may be used for mixing, and a kneader may be used for kneading.

There is no limitation on the method of molding the raw material paste. For example, a shape having the through holes can be formed by extrusion molding.

Next, preferably, the thus obtained honeycomb unit molding piece is dried. Any kind of dryer can be used, for example, use can be made of a microwave dryer, a hot air dryer, a dielectric dryer, a low-pressure dryer, a vacuum dryer, or a freezing dryer. In addition, preferably, the thus obtained molding piece is degreased. There is no limitation on conditions of degreasing, but the degreasing conditions can be selected appropriately according to the types and amounts of organic materials included in the molding piece. Preferably, degreasing is performed at a temperature of about 400° C. for about two hours. Preferably, the thus obtained molding piece is firing. There is no limitation on conditions of firing. Preferably, firing is performed at a temperature from about 600° C. to about 1200° C., more preferably, from about 600° C. to about 1000° C. If the firing temperature is higher than or equal to about 600° C., sintering of the ceramic particles can proceed easily, and the strength of the honeycomb structure does not decrease. If the firing temperature is lower than or equal to about 1200° C., the ceramic particles are not fired too much, the specific surface area increases, and the catalyst elements being carried can be highly dispersed easily.

Through the above steps, the honeycomb unit having plural through-holes can be formed.

Next, a sealing material, which becomes the sealing material layer 14, is applied on the thus obtained honeycomb structure, and plural such honeycomb structures are bonded one by one, and are dried and fixed afterwards to fabricate a honeycomb structure.

There is no limitation on the sealing material. For example, the sealing material may be a mixture of ceramic particles and an inorganic binder, or a mixture of an inorganic binder and an inorganic fiber, or a mixture of ceramic particles, an inorganic binder, and an inorganic fiber. Further, an organic binder can be added to the sealing material. There is no limitation on the organic binder. For example, the organic binder may be one or more selected from a group of polyvinyl alcohol, methylcellulose, ethylcellulose, and carboxymethylcellulose.

It is preferably that the sealing material be about 0.5 to about 2 mm in thickness. If the thickness of the sealing material is greater than or equal to about 0.5 mm, it is easy to obtain sufficient bonding strength. Meanwhile, because the sealing material does not function as a catalyst carrier, if the thickness of the sealing material is less than or equal to about 2 mm, the specific surface area does not decrease, and when catalyst elements are being carried, the catalyst elements can be well dispersed easily. The number of the bonded honeycomb units can be appropriately decided according to the size of the honeycomb structure in use, which includes the bonded honeycomb units carrying the catalyst elements. The honeycomb structure can be appropriately cut or polished according to its size and shape in use.

A coating material may be applied to the outside surface (side surfaces) of the honeycomb structure, on which the through-holes are not formed, and dried and fixed afterward to form a coating material layer. Due to this, it is possible to protect the outside surface and increase the strength.

There is no limitation on the coating material. It may be formed from the same material as the sealing material, or from materials different from the sealing material. In addition, the composition of the coating material may be the same as that of the sealing material, or different from that of the sealing material.

There is no limitation on the thickness of the coating material. Preferably, the coating material is about 0.1 to about 2 mm in thickness. If the thickness of the coating material is greater than about 0.1 mm, it is easy to protect the outside surface and increase the strength. Meanwhile, if the thickness of the coating material is less than or equal to about 2 mm, the specific surface area of the honeycomb structure does not decrease, and when catalyst elements are being carried, the catalyst elements can be well dispersed easily.

After plural honeycomb units are bonded with the sealing materials (when the coating materials are provided, after the coating material layers are formed), it is preferable to perform firing. In doing so, it is possible to degrease the organic binder when the organic binder is included in the sealing materials and the coating materials. The degreasing conditions may be determined appropriately according to types and loadings of the organic materials. Preferably, calcination is performed at about 700° C. for about two hours. As an example of the honeycomb structure, FIG. 1B is a schematic view of a cylindrical honeycomb structure 10 which is obtained by bonding plural solid rectangular honeycomb units 11 (refer to FIG. 1A) each having a square cross section. To form the honeycomb structure 10, the honeycomb units 11 are bonded together by the sealing material layer 14, and are cut into a cylindrical shape. Then, the outer surface of the honeycomb structure 10 without through-holes is covered by a coating material layer 16. Alternatively, the honeycomb structure 10 shown in FIG. 1B, for example, may be fabricated by shaping the cross sections of the honeycomb units into a square or a sector, and bonding these honeycomb units 11 together to form a certain shape (in FIG. 1B, a cylindrical). In this case, cutting and polishing steps may be omitted.

There is no limitation on applications of the thus obtained honeycomb structure 10. For example, it is preferable to use the honeycomb structure 10 as a catalyst carrier for converting exhaust gas from vehicles. In addition, when the honeycomb structure 10 is used as a catalyst carrier for converting exhaust gas from a Diesel engine, it may be used together with a Diesel particulate filter (DPF), which includes silicon carbide or other ceramic honeycomb structures to filter particulate materials (PM) in the exhaust gas, and has combustion purification functions. In this case, the honeycomb structure 10 of the present invention may be arranged in front (upstream) of or behind (downstream of) the DPF. When the honeycomb structure 10 is arranged in front of the DPF, if exothermic reactions occur in the honeycomb structure 10 of the present invention, heat can be transmitted to the DPF behind, thus increasing the temperature during regeneration of the DPF. In the meantime, when the honeycomb structure 10 is arranged behind the DPF, since the PM in the exhaust gas is filtered (burned) by the DPF so as to pass through the through-holes of the honeycomb structure, clogging can hardly occur. Further, when burning the PM by the DPF, gas compositions generated by incomplete combustion can also be processed.

It should be noted that the honeycomb structure can be used in applications as described above in the related art, and also can be used without carrying catalyst elements, for example, can be used as an absorbent for absorbing gas components or liquid components.

The thus obtained honeycomb structure 10 can carry the catalyst to form a honeycomb catalyst. There is no limitation on the catalyst. For example, the catalyst may include one or more of a noble metal, an alkali metal, an alkali-earth metal, and an oxide. For example, the noble metal may be platinum, palladium, rhodium, or others. The alkali metal may be potassium, sodium, or others. The alkali-earth metal may be barium or others. The oxide may be perovskite (such as, $La_{0.75}K_{0.25}MnO_3$), $CeO_2$, or others.

There is no limitation on applications of the thus obtained honeycomb catalyst. For example, it is preferable to use the honeycomb catalyst as a three way catalyst or an occlusion-type NOx catalyst.

There is no limitation on the way of carrying the catalyst. The catalyst may be carried after the honeycomb structure is fabricated, or may be carried at the stage of raw materials.

There is no limitation on the method of having the catalyst being carried. For example, impregnation may be used.

Below, examples of the honeycomb structures fabricated under various conditions are presented. It should be noted that the present invention is not limited to these examples.

EXAMPLE 1

First, γ alumina particles (having average particle diameter of 2 μm) in 40 parts by weight, serving as the ceramic particles, silica alumina fibers (having average fiber diameter of 10 μm, average fiber length of 100 μm, aspect ratio of 10) in 10 parts by weight, serving as the inorganic fibers, and silica sol (solid concentration 30 weight %) in 50 parts by weight, serving as the raw materials of the inorganic binder, are mixed. Further, methylcellulose in 6 parts by weight and tiny amounts of plasticizer and lubricant are added into the thus obtained mixture in 100 parts by weight, and are further mixed and kneaded, forming a mixture composition. Then, this mixture composition is extruded by using an extruder to perform extrusion molding, obtaining a raw molding piece.

Figure 3:
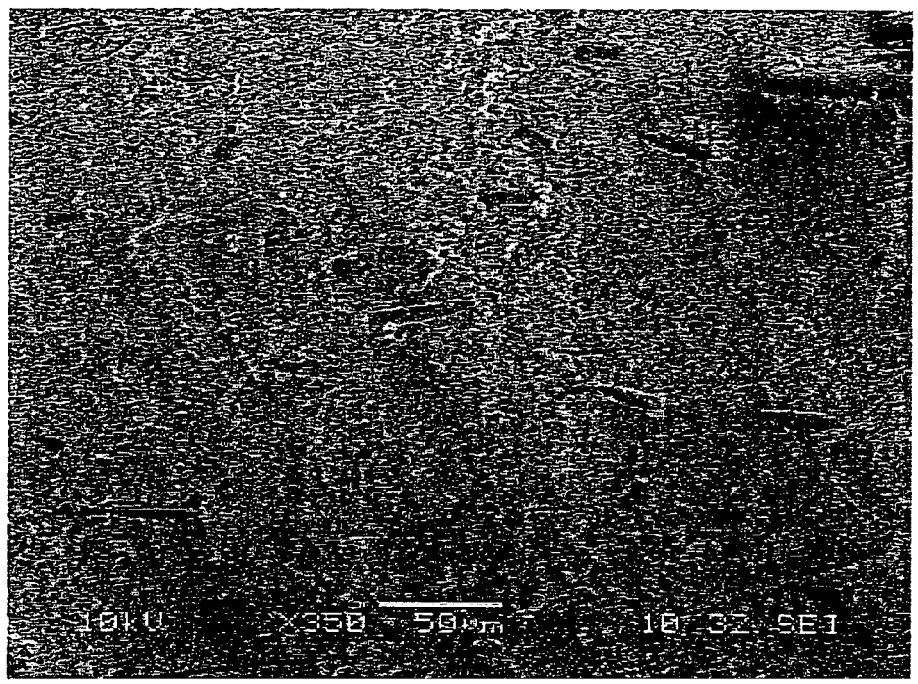
FIG. 3 is a SEM (Scanning Electron Microscopy) picture of a wall surface of the honeycomb structure of the present invention.

A microwave dryer and a hot air dryer are used to adequately dry the raw molding piece, and then the raw molding piece is maintained at 400° C. for two hours for degreasing. Afterward, the raw molding piece is maintained at 800° C. for two hours for firing. In this way, a honeycomb unit 11 is obtained which is in a square-pillar shape (34.3 mm×34.3 mm×150 mm), has a cell density of 93/cm² (600 cpsi), a wall thickness of 0.2 mm, and a square cell shape. FIG. 3 presents a SEM (Scanning Electron Microscopy) picture of the wall surface of the honeycomb unit 11. FIG. 3 reveals that the silica-alumina fibers are arranged along the extrusion direction of the raw material paste.

Next, a heat-resistant sealing paste was prepared by mixing γ alumina particles (having average particle diameter of 2 μm) in 29 parts by weight, silica alumina fibers (having average fiber diameter of 10 μm, and average fiber length of 100 μm) in 7 parts by weight, silica sol (solid concentration 30 weight %) in 34 parts by weight, carboxymethylcellulose in 5 parts by weight, and water in 25 parts by weight. With this sealing paste, plural honeycomb units 11 were bonded to fabricate a honeycomb structure.

Figure 4A:
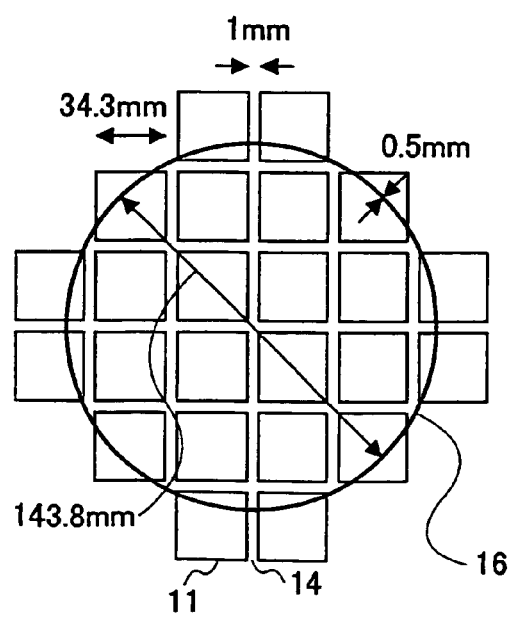
FIG. 4A is a schematic view of the honeycomb structure obtained by bonding plural honeycomb units, showing a cross section of the honeycomb structure having the through-holes.

FIG. 4A is a schematic view of the honeycomb structure obtained by bonding plural honeycomb units 11, showing a cross section of the honeycomb structure having the through-holes.

This honeycomb structure is fabricated by applying the sealing paste to the outside surface of the honeycomb structure to a thickness of 1 mm so as to bond the plural honeycomb units 11. After the honeycomb structure was fabricated in this way, a diamond cutter was used to cut the honeycomb structure into circular cylindrical shape so that the front face of the aggregate was of point symmetry, and the sealing paste was applied to the circular outside surface 16 without the through-holes 12 to a thickness of 0.5 mm to form a coating on the outside surface 16. Then, the aggregate was dried at 120° C., and maintained at 700° C. for two hours to degrease the sealing material layer and the coating material layer, thereby, a circular cylindrical honeycomb structure 10 was obtained (diameter: 143.8 mm, length: 150 mm).

Table 1 presents the unit shape of the honeycomb structure 10, the unit cross sectional area of the honeycomb structure 10, the unit area ratio of the honeycomb structure 10, the sealing layer area ratio of the honeycomb structure 10.

The thermal conductivity κf and the thickness df of the outer surface 13 of the honeycomb unit, the thermal conductivity κc and the thickness dc of the sealing material layer 14, the thermal conductivity κ of the combination of the outer surface 13 and the sealing material layer 14, and the quantity X (=κ/d×(dc/κc+df/κf)).

Here, the unit cross sectional area of the honeycomb structure 10 is defined to be a ratio of a sum of the cross sectional areas of the honeycomb units to the cross sectional area of the honeycomb structure.

In Table 1, a silica alumina fiber having a diameter of 10 μm, a length of 100 μm, and an aspect ratio of 10 is used as an inorganic fiber sample. In addition, when evaluating the sealing layer area ratio, the cross sectional area of the coating material layer is also included in the cross sectional area of the sealing material layer.

The thermal conductivities κf, κc, and κ are obtained by a laser flash method.

EXAMPLES 2, 3, COMPARATIVE EXAMPLES 1-3, AND REFERENCE EXAMPLE 1

Figure 4B:
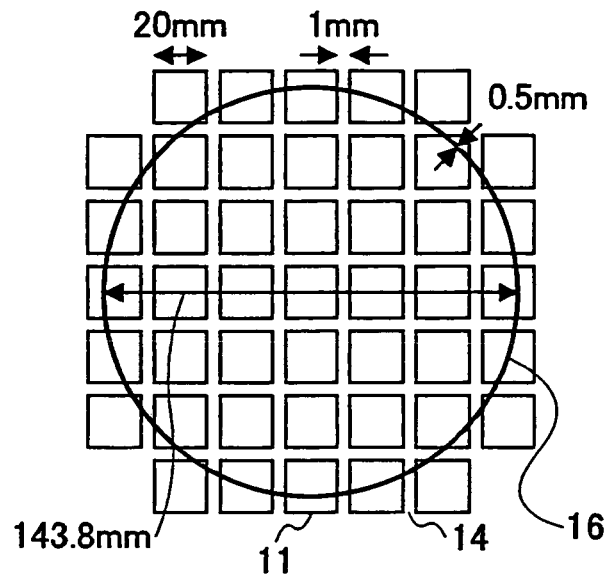
FIG. 4B is a schematic view of the honeycomb structure obtained by bonding plural honeycomb units, showing a cross section of the honeycomb structure having the through-holes.
Figure 4C:
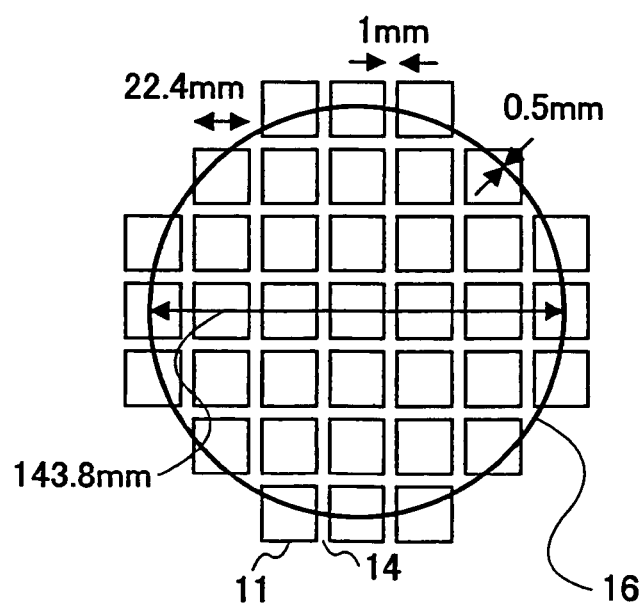
FIG. 4C is a schematic view of the honeycomb structure obtained by bonding plural honeycomb units, showing a cross section of the honeycomb structure having the through-holes.
Figure 4D:
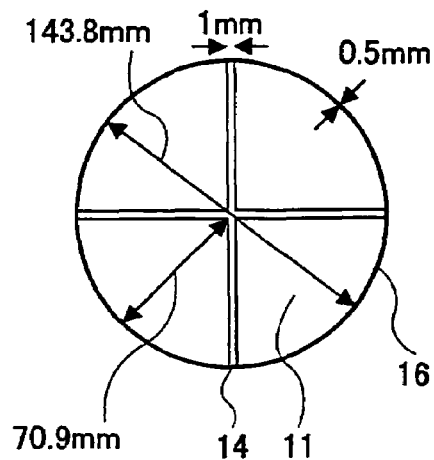
FIG. 4D is a schematic view of the honeycomb structure obtained by bonding plural honeycomb units, showing a cross section of the honeycomb structure having the through-holes.
Figure 5A:
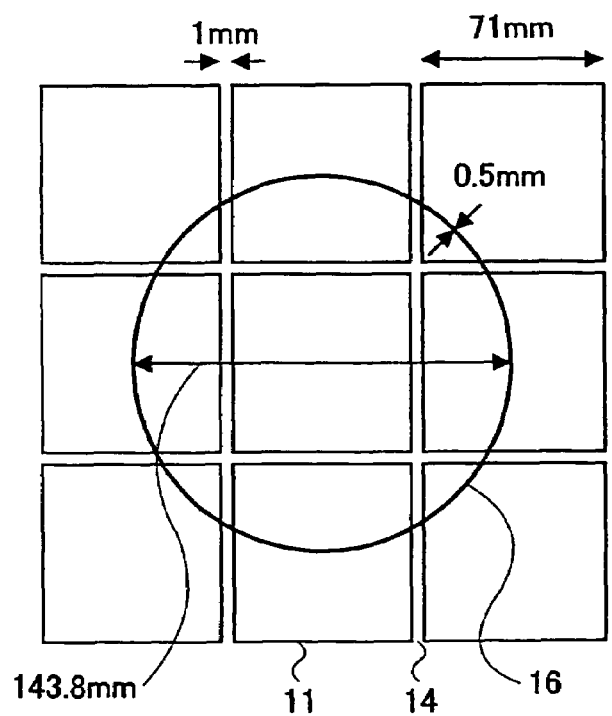
FIG. 5A is a schematic view of the honeycomb structure obtained by bonding plural honeycomb units, showing a cross section of the honeycomb structure having the through-holes.
Figure 5B:
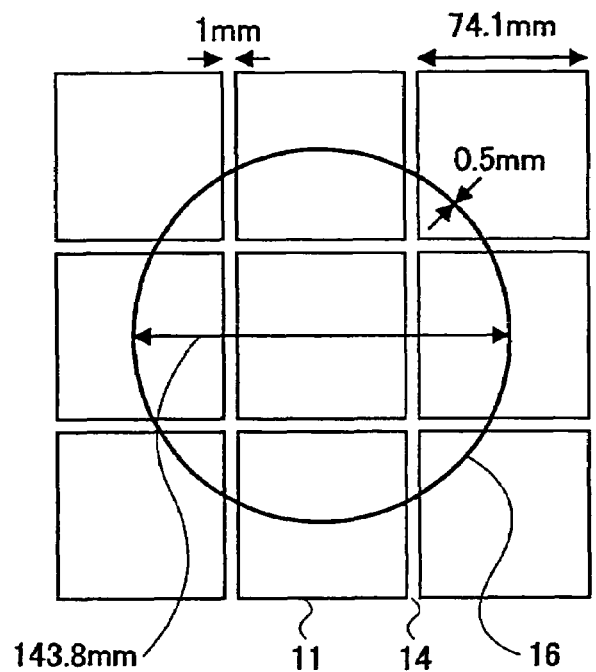
FIG. 5B is a schematic view of the honeycomb structure obtained by bonding plural honeycomb units, showing a cross section of the honeycomb structure having the through-holes.
Figure 5C:
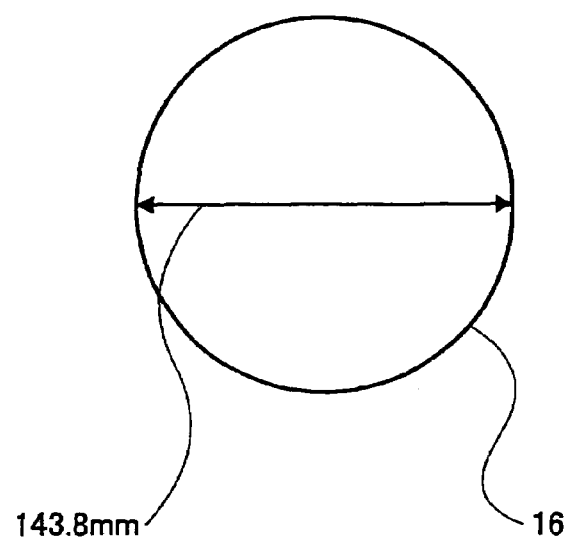
FIG. 5C is a schematic view of the honeycomb structure obtained by one honeycomb unit, showing a cross section of the honeycomb structure having the through-holes.

Honeycomb structures 10 were fabricated in the same way as in the first example with the shapes of the honeycomb units to be those displayed in Table 1. Specifically, FIG. 4B, FIG. 4C, and FIG. 4D show honeycomb structures 10 of comparative example 1, example 2, and reference example 1, and FIG. 5A, FIG. 5B, and FIG. 5C show honeycomb structures 10 of example 3 and comparative examples 2, 3.

In the comparative example 3, the honeycomb structures 10 is formed integrally, hence, the bonding step and the cutting step were not performed.

COMPARATIVE EXAMPLE 4

A honeycomb structure 10 was fabricated as below. A heat-resistant sealing paste was prepared by mixing γ alumina particles (having average particle diameter of 2 μm) in 17 parts by weight, silica alumina fibers (having average fiber diameter of 10 μm, and average fiber length of 100 μm) in 3 parts by weight, silica sol (solid concentration 30 weight %) in 30 parts by weight, acrylic (having average particle diameter of 20 μm) in 20 parts by weight, carboxymethylcellulose in 5 parts by weight, and water in 25 parts by weight. Then, with this sealing paste, plural honeycomb units 11 were bonded to fabricate a honeycomb structure in the same way as in the first example. The shape of the fabricated honeycomb structure 10 is the same as that shown in FIG. 4A.

EXAMPLE 4

A honeycomb structure 10 was fabricated as below. A heat-resistant sealing paste was prepared by mixing SiC particles (having average particle diameter of 0.5 μm) in 29 parts by weight, silica alumina fibers (having average fiber diameter of 10 μm, and average fiber length of 100 μm) in 7 parts by weight, silica sol (solid concentration 30 weight %) in 34 parts by weight, carboxymethylcellulose in 5 parts by weight, and water in 25 parts by weight. Then, with this sealing paste, plural honeycomb units 11 were bonded to fabricate a honeycomb structure in the same way as in the first example. The shape of the fabricated honeycomb structure 10 is the same as that shown in FIG. 4A.

EXAMPLE 5

A honeycomb structure 10 was fabricated as below. A heat-resistant sealing paste was prepared by mixing γ alumina particles (having average particle diameter of 2 μm) in 40 parts by weight, silica alumina fibers (having average fiber diameter of 10 μm, and average fiber length of 100 μm, aspect ratio of 10) in 10 parts by weight, silica sol (solid concentration 30 weight %) in 50 parts by weight. Then, methylcellulose (as the organic binder) in 6 parts by weight and tiny amounts of plasticizer and lubricant were added into the above mixture, which was assumed to in 100 parts by weight, and were further mixed and kneaded to form a mixture composition. Then, with this mixture composition, a honeycomb structure was fabricated in the same way as in the first example. The shape of the fabricated honeycomb structure 10 is the same as that shown in FIG. 4A.

COMPARATIVE EXAMPLE 5

A honeycomb structure 10 was fabricated in the same way as in the example 5 except that the heat-resistant prepared in the comparative example 4 was used to bond plural honeycomb units 11. The shape of the fabricated honeycomb structure 10 is the same as that shown in FIG. 4A.

EXAMPLE 6

A honeycomb structure 10 was fabricated in the same way as in the example 5 except that the heat-resistant prepared in the example 4 was used to bond the plural honeycomb units 11. The shape of the fabricated honeycomb structure 10 is the same as that shown in FIG. 4A.

REFERENCE EXAMPLES 2-5 AND COMPARATIVE EXAMPLES 6-8

Honeycomb units 11 were fabricated in the same way as in the first example by using titania particles (average particle diameter: 2 μm) as the ceramic particles with the shapes of the honeycomb units to be those displayed in Table 1. Next, in the same way as in the first example, except that titania particles (average particle diameter: 2 μm) were used as the ceramic particles of the sealing material layer and the coating material layer, honeycomb structures 10 were fabricated. The shapes of the honeycomb structures 10 of reference example 2, comparative example 6, and reference examples 3, 4 are the same as those shown in FIG. 4A through FIG. 4D, and the shapes of the honeycomb structures 10 of reference example 5, and comparative examples 7, 8 are the same as those shown in FIG. 5A through FIG. 5C. In comparative example 8, the honeycomb structure 10 was formed integrally.

REFERENCE EXAMPLES 6-9 AND COMPARATIVE EXAMPLES 9-11

Honeycomb units 11 were fabricated in the same way as in the first example by using silica particles (average particle diameter: 2 μm) as the ceramic particles with the shapes of the honeycomb units to be those displayed in Table 1. Next, in the same way as in the first example, except that silica particles (average particle diameter: 2 μm) were used as the ceramic particles of the sealing material layer and the coating material layer, honeycomb structures 10 were fabricated. The shapes of the honeycomb structures 10 of reference example 6, comparative example 9, and reference examples 7, 8 are the same as those shown in FIG. 4A through FIG. 4D, and the shapes of the honeycomb structures 10 of reference example 9 and comparative examples 10, 11 are the same as those shown in FIG. 5A through FIG. 5C. In comparative example 11, the honeycomb structure 10 was formed integrally.

REFERENCE EXAMPLES 10-13 AND COMPARATIVE EXAMPLES 12-15

Honeycomb units 11 were fabricated in the same way as in the first example by using zirconia particles (average particle diameter: 2 μm) as the ceramic particles with the shapes of the honeycomb units to be those displayed in Table 1. Next, in the same way as in the first example, except that zirconia particles (average particle diameter: 2 μm) were used as the ceramic particles of the sealing material layer and the coating material layer, honeycomb structures 10 were fabricated. The shapes of the honeycomb structures 10 of reference example 10, comparative example 12, and reference examples 11, 12 are the same as those shown in FIG. 4A through FIG. 4D, and the shapes of the honeycomb structures 10 of reference example 13 and comparative examples 13, 14 are the same as those shown in FIG. 5A through FIG. 5C. In comparative example 14, the honeycomb structure 10 was formed integrally.

COMPARATIVE EXAMPLE 15

A cylindrical cordierite-based honeycomb structure (diameter: 143.8 mm, length: 150 mm) available in the market, which has an alumina catalyst carrying layer inside the through-holes, was used. The cell shape was a hexagon, the cell density was 62/cm$^2$ (400 cpsi), and the wall thickness was 0.18 mm. The front view of the honeycomb structure is the same as that shown in FIG. 5C.

REFERENCE EXAMPLES 14-18

Honeycomb units 11 were fabricated in the same way as in the first example by using silica-alumina fibers having the shapes shown in Table 2 as the inorganic fiber. Next, in the same way as in the first example, except that the silica-alumina fibers were used as the silica-alumina fibers of the sealing material layer and the coating material layer, honeycomb structures 10 were fabricated. The shapes of the honeycomb structures 10 of reference examples 14 through 18 are the same as that shown in FIG. 4A.

In Table 2, γ alumina particles are used as a ceramic particle sample, the unit area ratio is 93.5%, and the area ratio of the sealing layer area ratio and the coating material layer is 6.5%.

REFERENCE EXAMPLES 19-22

Honeycomb structures 10 were fabricated in the same way as in the first example except that the cross sectional area of the honeycomb units and the thickness of the sealing material layer for bonding the honeycomb units 11 were changed to be those in Table 3. The shapes of the honeycomb structures 10 of reference examples 19, 20 are the same as that shown in FIG. 4A, and the shapes of the honeycomb structures 10 of reference examples 21, 22 are the same as that shown in FIG. 4C.

In Table 3, γ alumina particles were used as a ceramic particle sample, a silica alumina fiber having a diameter of 10 μm, a length of 100 μm, and an aspect ratio of 10 is used as an inorganic fiber sample. In addition, for the sealing layer area ratio, the cross sectional area of the coating material layer is also included in the cross sectional area of the sealing material layer.

REFERENCE EXAMPLES 23

A honeycomb structure 10 was fabricated in the same way as in the first example except that an alumina sol (solid concentration 30 weight %) was used as the material of the inorganic binder, as shown in Table 3.

REFERENCE EXAMPLES 24, 25

Honeycomb structures 10 were fabricated in the same way as in the first example except that sepiolite, and attapulgite were used as the material of the inorganic binder, as shown in Table 3.

Specifically, γ alumina particles (having average particle diameter of 2 μm) in 40 parts by weight, silica alumina fibers (having average fiber diameter of 10 μm, and average fiber length of 100 μm, aspect ratio of 10) in 10 parts by weight, a material of the inorganic binder in 15 parts by weight, and water in 35 parts by weight were mixed. Further, as in the first example, an organic binder, a plasticizer, and a lubricant were added into the thus obtained mixture, and the mixture was fired, thus obtaining the honeycomb units 11. Next, with the same sealing paste as that in the first example, the honeycomb units 11 were bonded to fabricate a honeycomb structure. The thus obtained honeycomb structure was cut, and the coating material layer 16 was applied, thereby, obtaining a circular cylindrical honeycomb structure 10 (diameter: 143.8 mm, length: 150 mm).

REFERENCE EXAMPLE 26

A honeycomb structure 10 was fabricated in the same way as in the first example except that the inorganic binder was not used, as shown in Table 3.

Specifically, γ alumina particles (having average particle diameter of 2 μm) in 50 parts by weight, silica alumina fibers (having average fiber diameter of 10 μm, and average fiber length of 100 μm, aspect ratio of 10) in 15 parts by weight, and water in 35 parts by weight were mixed. Further, as in the first example, an organic binder, a plasticizer, and a lubricant were added into the above mixture, and the mixture was fired at 1000° C., thus obtaining the honeycomb units 11. Next, with the same sealing paste as that in the first example, the honeycomb units 11 were bonded together to fabricate a honeycomb structure. The thus obtained honeycomb structure was cut, and the coating material layer 16 was applied, thereby, obtaining a circular cylindrical honeycomb structure 10 (diameter: 143.8 mm, length: 150 mm).

Specific Surface Area Measurement

The specific surface area of the honeycomb structure was measured in the following way. First, the volume of the honeycomb units 11 and the volume of the sealing material layer were calculated, and a calculation was made of a ratio A (volume %) of the materials of the honeycomb units 11 to the volume of the honeycomb structure. Next, a measurement was made of a BET specific surface area per unit weight of the honeycomb unit 11 ($m^2/g$) (denoted as "B"). The BET specific surface area was measured by "one-point method" in compliance with JIS-R-1626 (1996) set forth in Japanese Industrial Standards by using a BET measurement device "Micrometitics" FlowSorb II-2300 (manufactured by Shimadzu Co.). In the measurement, cylindrical slice samples were used which were obtained by cutting out (diameter: 15 mm, length: 15 mm) from the honeycomb units. Then, the apparent density C (g/L) of the honeycomb units 11 was calculated from the weight of the honeycomb units 11 and the volume corresponding to the outline shape of the honeycomb units. The specific surface area S ($m^2/L$) of the honeycomb structure was calculated by using the following equation.

$$S = (A/100) \times B \times C$$

Here, the specific surface area of the honeycomb structure is defined to be the apparent specific surface area per volume of the honeycomb structure.

Additionally, the entire contents of JIS-R-1626 (1996) are hereby incorporated by reference.

Repetitive Thermal Shock & Vibration Test

A repetitive thermal shock test and a vibration test were made on the honeycomb structure in the following way.

The thermal shock test was performed in the following way. A thermal insulating alumina mat made from alumina fibers (product name: MAFTEC, manufactured by Mitsubishi Chemistry Co., size: 46.5 cm×15 cm, thickness: 6 mm) was wound on the outer surface of the honeycomb structure, and was disposed in a metal casing 21; the honeycomb structure together with the metal casing 21 was set in a firing furnace at 600° C., and was heated for 10 minutes; then, the honeycomb structure was taken out from the firing furnace, and was quenched to the room temperature.

Next, a vibration test was performed on the honeycomb structure, which was in the metal casing 21.

Figure 6A:
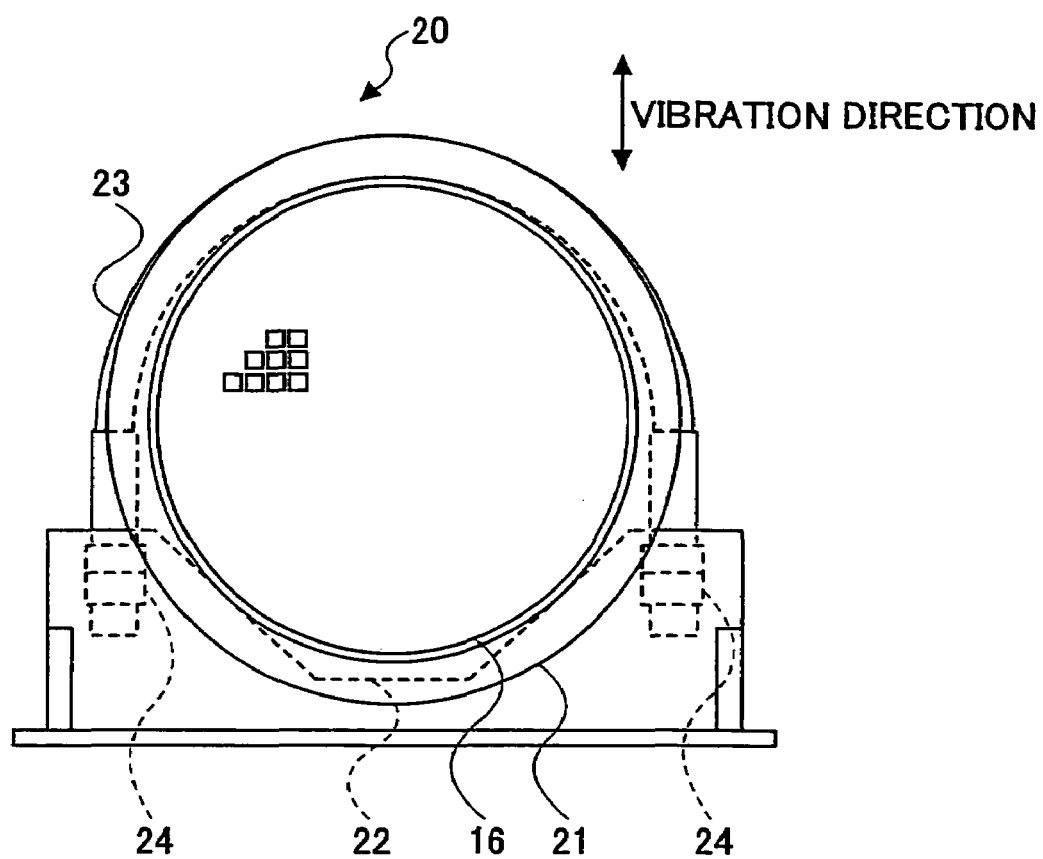
FIG. 6A is a front view of a vibration device 20.

FIG. 6A is a front view of a vibration device 20 used in the vibration test.

Figure 6B:
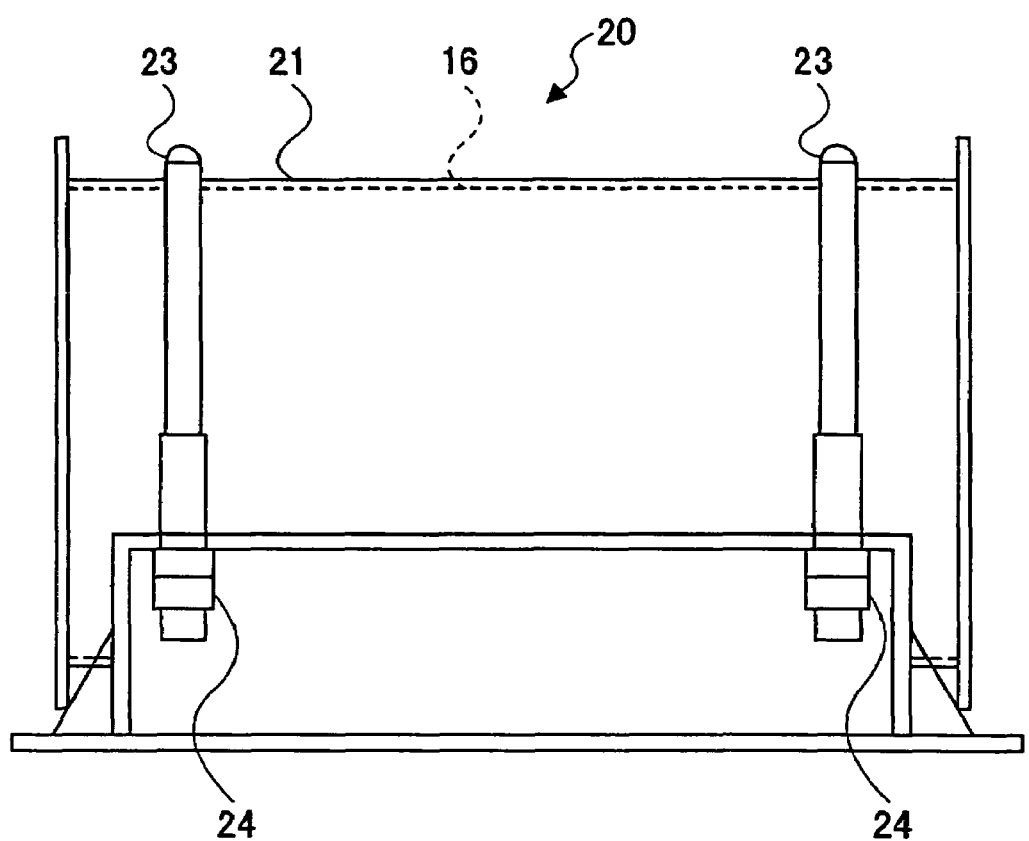
FIG. 6B is a side view of the vibration device 20.

FIG. 6B is a side view of the vibration device 20.

The honeycomb structure in the metal casing 21 was placed on a stand 22, and was fixed with a U-shaped fixture 23 and a screw 24. Hence, the metal casing 21 was integrated with the stand 22 and the fixture 23, and they could shake together. The vibration test was performed with a frequency of 160 MHz, an accelerator of 30 G, amplitude of 0.58 mm, a holding time of 10 hours, and at the room temperature, with the vibrating direction being in the Z-axis direction.

The thermal shock test and the vibration test were executed alternately for 10 times, respectively. The weight (T0) of the honeycomb structure before the test and the weight (Ti) of the honeycomb structure after the test, were measured and the weight reduction rate was calculated by using the following formula:

$$G = 100 \times (T0 - Ti)/T0.$$

Pressure Loss Measurement

A pressure loss of the honeycomb structure was measured in the following way.

Figure 7:
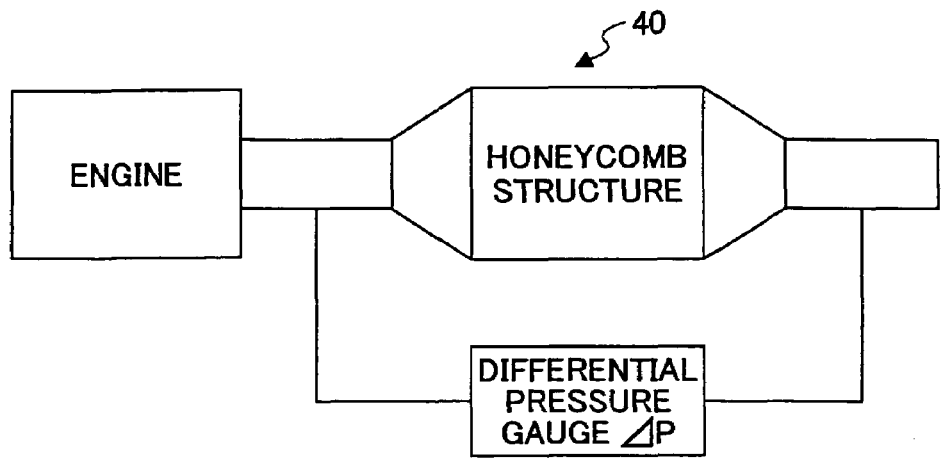
FIG. 7 is a view of a pressure loss measurement device 40.

FIG. 7 is a view of a pressure loss measurement device 40.

A honeycomb structure wound by an alumina mat was set in a metal casing, and the honeycomb structure together with the metal casing 21 was placed in an exhaust pipe of a 2 L common-rail Diesel engine, and pressure gages were attached to the front side and back side of the honeycomb structure to measure the pressure difference. The measurement was performed with the number of revolution of the engine to be 1500 rpm, and the torque was set to be 50 Nm, and the pressure difference after the engine started running for 5 minutes was measured.

Honeycomb Catalyst

The honeycomb structure 10 was immersed in a platinum nitrate solution, and adjustment was made so that the platinum was carried by the honeycomb structure with the weight of platinum per unit volume of the honeycomb structure being 2 g/L. Then, this composition was maintained at 600° C. for one hour, thereby obtaining a honeycomb catalyst.

Filter Regeneration Test

The honeycomb catalyst was combined with a DPF (Diesel particulate filter) to form an exhaust gas purification (conversion) test sample for evaluating regeneration efficiency of the DPF. The honeycomb catalyst was placed at an entrance of an exhaust pipe of the engine, and a DPF, which is 144 mm in diameter and 150 mm in length, was set at a position which was 5 mm from the honeycomb catalyst on the side of the exit of the exhaust pipe. The engine was first operated at a number of revolution of 3000 rpm, a torque of 50 Nm, 20 grams soot was captured by the DPF. Next, the engine was operated in a post injection manner for seven minutes to burn the soot. From a change of the weight of the DPF before burning the soot and after burning the soot, the regeneration efficiency of the DPF was obtained. Note that when all of the soot was burned, the regeneration efficiency of the DPF was 100%.

Evaluation Results

Table 4 presents evaluation results of the weight reduction rate G in the repetitive thermal shock and vibration test, the pressure loss, and the regeneration efficiency.

In table 4, a silica alumina fiber having a diameter of 10 μm, a length of 100 μm, and an aspect ratio of 10 is used as an inorganic fiber sample.

Figure 8:
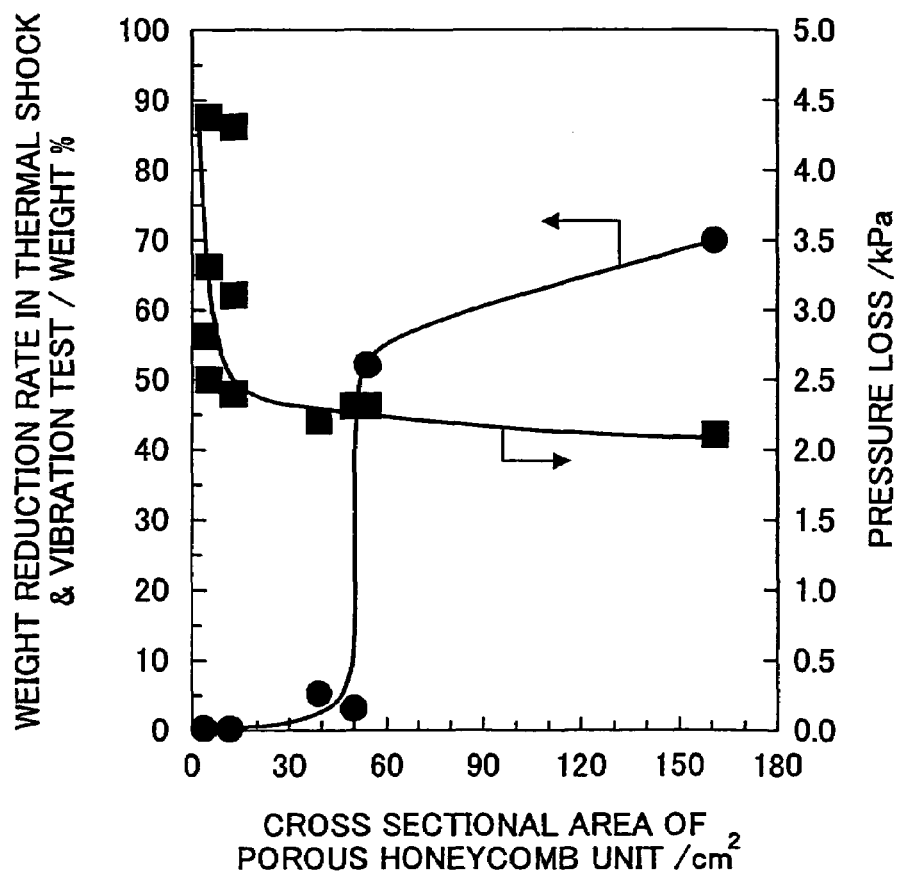
FIG. 8 shows the relationship between the cross sectional area of the honeycomb unit and the weight reduction rate G and the pressure loss of the honeycomb unit.

FIG. 8 are plots showing the evaluation results, where the abscissa represents the cross sectional area of the honeycomb unit, the ordinate represents the weight reduction rate G in the repetitive thermal shock and vibration test and the pressure loss.

As revealed by measurement results in FIG. 8, with the ceramic particles, the inorganic fibers, and the inorganic binder as main ingredients, and with the cross sectional area of the honeycomb unit being from about 5 $cm^2$ to about 50 $cm^2$, the specific surface area of the honeycomb structure increases, and the resistance against thermal shock and vibration becomes high. In addition, with the quantity X (=κ/d× (dc/κc+df/κf)) being from about 0.5 to about 1, the regeneration efficiency of the DPF was improved.

Figure 9:
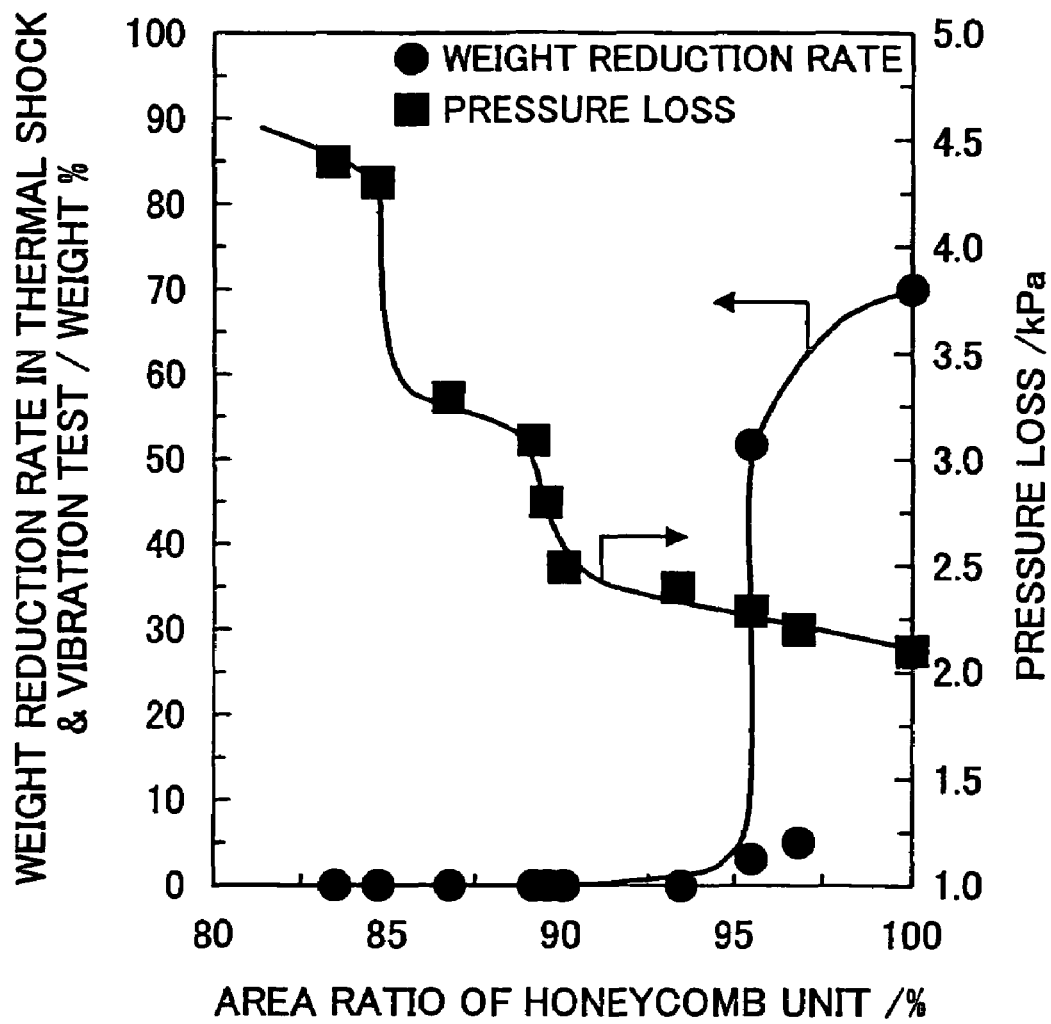
FIG. 9 shows the relationship between the area ratio of the honeycomb unit and the weight reduction rate G and the pressure loss of the honeycomb unit.

FIG. 9 are plots showing the evaluation results, where the abscissa represents the area ratio of the honeycomb unit, the ordinate represents the weight reduction rate G in the repetitive thermal shock and vibration test and the pressure loss.

As revealed by measurement results in FIG. 9, with the ceramic particles, the inorganic fibers, and the inorganic binder as main ingredients, with the cross sectional area of the honeycomb unit being from about 5 $cm^2$ to about 50 $cm^2$, and the area ratio of the honeycomb units being greater than or equal to about 85%, the specific surface area of the honeycomb structure can be increased, the resistance against thermal shock and vibration becomes high, and the pressure loss decreases. Particularly, the pressure loss decreases significantly when the area ratio of the honeycomb units being greater than about 90%.

Table 5 shows measurement results of example 1, references 14 to 18 in which the aspect ratios of the inorganic fibers are varied. Specifically, Table 5 includes results of the diameter, length, the aspect ratio of the inorganic fiber, the specific surface area of the honeycomb unit 11, the specific surface area S of the honeycomb structure, the weight reduction rate G in the repetitive thermal shock and vibration test, and the pressure loss.

In Table 5, γ alumina particles are used as a ceramic particle sample.

Figure 10:
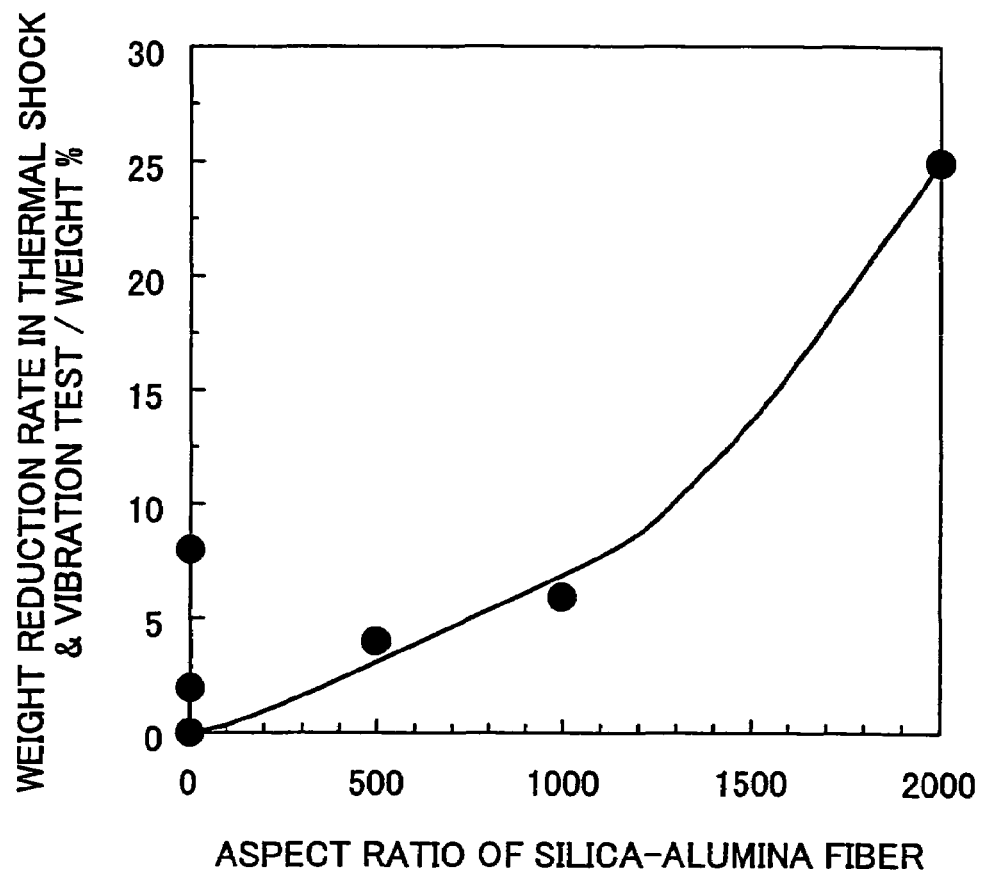
FIG. 10 shows the relationship between the aspect ratio of the silica alumina fiber and the weight reduction rate G and the pressure loss of the honeycomb unit.

FIG. 10 are plots showing the evaluation results, where the abscissa represents the aspect ratio of the inorganic fiber, the ordinate represents the weight reduction rate G in the repetitive thermal shock and vibration test and the pressure loss.

As revealed by FIG. 10, with the aspect ratio of the inorganic fiber being from about 2 to about 1000, the resistance against thermal shock and vibration becomes high.

Table 6 shows measurement results of references 23 to 25 in which the types of the inorganic binders are changed, and results of references 26 in which the inorganic binder is not added. Specifically, Table 6 includes results of types of the inorganic binders, firing temperature of the honeycomb unit 11, the area ratio of the honeycomb unit 11, the specific surface area of the honeycomb unit 11, the specific surface area S of the honeycomb structure, the weight reduction rate G in the repetitive thermal shock and vibration test, and the pressure loss.

In Table 6, γ alumina particles are used as a ceramic particle sample, and a silica alumina fiber having a diameter of 10 μm, a length of 100 μm, and an aspect ratio of 10 is used as an inorganic fiber sample, and the unit shape is a 3.43 cm square.

As revealed in Table 6, when the inorganic binder is not added, sufficiently high strength can be obtained by performing firing at a relatively high temperature. In the meantime, when the inorganic binder is mixed, sufficiently high strength can be obtained by performing firing even at a relatively low temperature. Further, even when the inorganic binder is an alumina sol or a clay sol, the specific surface area of the honeycomb structure 10 can be increased, and the resistance against thermal shock and vibration becomes high.

For example, the present invention can be used as a carrier of a catalyst for converting exhaust gas from a vehicle. In addition, the present invention can be used as an absorbent for absorbing gas components or liquid components.

While the invention has been described with reference to preferred embodiments, the invention is not limited to these embodiments, but numerous modifications could be made thereto without departing from the basic concept and scope described in the claims.

This patent application is based on international priority patent application PCT/JP2005/011660 filed on Jun. 24, 2005, the entire contents of which are hereby incorporated by reference.

TABLE 1

| sample | ceramic particles | unit shape cm | unit cross sectional area cm² | unit area ratio % | sealing layer area ratio % | κf W/mK | df mm | κc W/mK | dc mm | κ W/mK | X — |
|---|---|---|---|---|---|---|---|---|---|---|---|
| example 1 | alumina | 3.43 cm square | 11.8 | 93.5 | 6.5 | 0.2 | 0.2 | 0.1 | 1.0 | 0.09 | 0.83 |
| comparative example 1 | alumina | 2.00 cm square | 4.0 | 89.7 | 10.3 | 0.2 | 0.2 | 0.1 | 1.0 | 0.09 | 0.83 |
| example 2 | alumina | 2.24 cm square | 5.0 | 90.2 | 9.8 | 0.2 | 0.2 | 0.1 | 1.0 | 0.09 | 0.83 |
| reference example 1 | alumina | 7.09 cm sector | 39.5 | 96.9 | 3.1 | — | — | — | — | — | — |
| example 3 | alumina | 7.10 cm square | 50.0 | 95.5 | 4.5 | 0.2 | 0.2 | 0.1 | 1.0 | 0.09 | 0.83 |
| comparative example 2 | alumina | 7.41 cm square | 55.0 | 95.6 | 4.4 | 0.2 | 0.2 | 0.1 | 1.0 | 0.09 | 0.83 |
| comparative example 3 | alumina | integral | 162.0 | 100.0 | 0 | — | — | — | — | — | — |
| comparative example 4 | alumina | 3.43 cm square | 11.8 | 93.5 | 6.5 | 0.2 | 0.2 | 0.05 | 1.0 | 0.025 | 0.44 |
| example 4 | alumina | 3.43 cm square | 11.8 | 93.5 | 6.5 | 0.2 | 0.2 | 1.0 | 1.0 | 0.3 | 0.50 |
| example 5 | alumina | 3.43 cm square | 11.8 | 93.5 | 6.5 | 0.5 | 0.2 | 0.1 | 1.0 | 0.08 | 0.69 |
| comparative example 5 | alumina | 3.43 cm square | 11.8 | 93.5 | 6.5 | 0.5 | 0.2 | 0.05 | 1.0 | 0.028 | 0.48 |
| example 6 | alumina | 3.43 cm square | 11.8 | 93.5 | 6.5 | 0.5 | 0.2 | 1.0 | 1.0 | 0.5 | 0.58 |
| reference example 2 | titania | 3.43 cm square | 11.8 | 93.5 | 6.5 | — | — | — | — | — | — |
| comparative example 6 | titania | 2.00 cm square | 4.0 | 89.7 | 10.3 | — | — | — | — | — | — |
| reference example 3 | titania | 2.24 cm square | 5.0 | 90.2 | 9.8 | — | — | — | — | — | — |
| reference example 4 | titania | 7.09 cm sector | 39.5 | 96.9 | 3.1 | — | — | — | — | — | — |
| reference example 5 | titania | 7.10 cm square | 50.0 | 95.5 | 4.5 | — | — | — | — | — | — |
| comparative example 7 | titania | 7.41 cm square | 55.0 | 95.6 | 4.4 | — | — | — | — | — | — |
| comparative example 8 | titania | integral | 162.0 | 100.0 | 0 | — | — | — | — | — | — |
| reference example 6 | silica | 3.43 cm square | 11.8 | 93.5 | 6.5 | — | — | — | — | — | — |
| comparative example 9 | silica | 2.00 cm square | 4.0 | 89.7 | 10.3 | — | — | — | — | — | — |
| reference example 7 | silica | 2.24 cm square | 5.0 | 90.2 | 9.8 | — | — | — | — | — | — |
| reference example 8 | silica | 7.09 cm sector | 39.5 | 96.9 | 3.1 | — | — | — | — | — | — |
| reference example 9 | silica | 7.10 cm square | 50.0 | 95.5 | 4.5 | — | — | — | — | — | — |
| comparative example 10 | silica | 7.41 cm square | 55.0 | 95.6 | 4.4 | — | — | — | — | — | — |
| comparative example 11 | silica | integral | 162.0 | 100.0 | 0 | — | — | — | — | — | — |
| reference example 10 | zirconium | 3.43 cm square | 11.8 | 93.5 | 6.5 | — | — | — | — | — | — |
| comparative example 12 | zirconium | 2.00 cm square | 4.0 | 89.7 | 10.3 | — | — | — | — | — | — |
| reference example 11 | zirconium | 2.24 cm square | 5.0 | 90.2 | 9.8 | — | — | — | — | — | — |
| reference example 12 | zirconium | 7.09 cm sector | 39.5 | 96.9 | 3.1 | — | — | — | — | — | — |
| reference example 13 | zirconium | 7.10 cm square | 50.0 | 95.5 | 4.5 | — | — | — | — | — | — |
| comparative example 13 | zirconium | 7.41 cm square | 55.0 | 95.6 | 4.4 | — | — | — | — | — | — |
| comparative example 14 | zirconium | integral | 162.0 | 100.0 | 0 | — | — | — | — | — | — |
| comparative example 15 | alumina + cordierite | integral | 162.0 | 100.0 | 0 | — | — | — | — | — | — |

TABLE 2

| sample | inorganic fiber type | diameter μm | length μm | aspect ratio | unit shape cm | unit cross sectional area cm² |
|---|---|---|---|---|---|---|
| example 1 | silica alumina fiber | 10 | 100 | 10 | 3.43 cm square | 11.8 |
| reference example 14 | silica alumina fiber | 5 | 50 | 10 | 3.43 cm square | 11.8 |
| reference example 15 | silica alumina fiber | 10 | 20 | 2 | 3.43 cm square | 11.8 |
| reference example 16 | silica alumina fiber | 10 | 5000 | 500 | 3.43 cm square | 11.8 |
| reference example 17 | silica alumina fiber | 10 | 10000 | 1000 | 3.43 cm square | 11.8 |
| reference example 18 | silica alumina fiber | 10 | 20000 | 2000 | 3.43 cm square | 11.8 |

TABLE 3

| sample | inorganic binder | unit cross sectional area cm² | sealing layer thickness mm | unit area ratio % | sealing layer area ratio % | firing temperature °C |
|---|---|---|---|---|---|---|
| reference example 19 | silica sol | 11.8 | 2.0 | 89.3 | 10.7 | 800 |
| reference example 20 | silica sol | 11.8 | 3.0 | 84.8 | 15.2 | 800 |
| reference example 21 | silica sol | 5.0 | 2.0 | 83.5 | 16.5 | 800 |
| reference example 22 | silica sol | 5.0 | 1.5 | 86.8 | 13.2 | 800 |
| reference example 23 | alumina sol | 11.8 | 1.0 | 93.5 | 6.5 | 800 |
| reference example 24 | sepiolite | 11.8 | 1.0 | 93.5 | 6.5 | 800 |
| reference example 25 | attapulgite | 11.8 | 1.0 | 93.5 | 6.5 | 800 |
| reference example 26 | — | 11.8 | 1.0 | 93.5 | 6.5 | 1000 |

TABLE 4

| sample | ceramic particles | unit cross sectional area cm² | unit area ratio % | specific surface area of honeycomb unit m²/L | specific surface area of honeycomb structure S m²/L | weight reduction rate G in thermal shock & vibration test weight % | pressure loss kPa | regeneration efficiency % |
|---|---|---|---|---|---|---|---|---|
| example 1 | alumina | 11.8 | 93.5 | 42000 | 39270 | 0 | 2.4 | 85 |
| comparative example 1 | alumina | 4.0 | 89.7 | 42000 | 37674 | 0 | 2.8 | 75 |
| example 2 | alumina | 5.0 | 90.2 | 42000 | 37884 | 0 | 2.5 | 80 |
| reference example 1 | alumina | 39.5 | 96.9 | 42000 | 40698 | 5 | 2.2 | — |
| example 3 | alumina | 50.0 | 95.5 | 42000 | 40110 | 3 | 2.3 | 87 |
| comparative example 2 | alumina | 55.0 | 95.6 | 42000 | 40152 | 52 | 2.3 | 87 |
| comparative example 3 | alumina | 162.0 | 100.0 | 42000 | 42000 | 70 | 2.1 | — |
| comparative example 4 | alumina | 11.8 | 93.5 | 42000 | 39270 | 7 | 2.4 | 53 |
| example 4 | alumina | 11.8 | 93.5 | 42000 | 39270 | 0 | 2.4 | 90 |
| example 5 | alumina | 11.8 | 93.5 | 42000 | 39270 | 0 | 2.4 | 81 |
| comparative example 5 | alumina | 11.8 | 93.5 | 42000 | 39270 | 5 | 2.4 | 55 |
| example 6 | alumina | 11.8 | 93.5 | 42000 | 39270 | 0 | 2.4 | 89 |
| reference example 2 | titania | 11.8 | 93.5 | 38000 | 35530 | 0 | 2.4 | — |
| comparative example 6 | titania | 4.0 | 89.7 | 38000 | 34086 | 0 | 2.8 | — |
| reference example 3 | titania | 5.0 | 90.2 | 38000 | 34276 | 0 | 2.5 | — |
| reference example 4 | titania | 39.5 | 96.9 | 38000 | 36822 | 7 | 2.2 | — |
| reference example 5 | titania | 50.0 | 95.5 | 38000 | 36290 | 5 | 2.3 | — |
| comparative example 7 | titania | 55.0 | 95.6 | 38000 | 36328 | 63 | 2.3 | — |
| comparative example 8 | titania | 162.0 | 100.0 | 38000 | 38000 | 90 | 2.1 | — |
| reference example 6 | silica | 11.8 | 93.5 | 41000 | 38335 | 0 | 2.4 | — |
| comparative example 9 | silica | 4.0 | 89.7 | 41000 | 36777 | 0 | 2.8 | — |
| reference example 7 | silica | 5.0 | 90.2 | 41000 | 36982 | 0 | 2.5 | — |
| reference example 8 | silica | 39.5 | 96.9 | 41000 | 39729 | 4 | 2.2 | — |
| reference example 9 | silica | 50.0 | 95.5 | 41000 | 39155 | 3 | 2.3 | — |
| comparative example 10 | silica | 55.0 | 95.6 | 41000 | 39196 | 42 | 2.3 | — |
| comparative example 11 | silica | 162.0 | 100.0 | 41000 | 41000 | 65 | 2.1 | — |
| reference example 10 | zirconium | 11.8 | 93.5 | 41500 | 38803 | 0 | 2.4 | — |
| comparative example 12 | zirconium | 4.0 | 89.7 | 41500 | 37226 | 0 | 2.8 | — |
| reference example 11 | zirconium | 5.0 | 90.2 | 41500 | 37433 | 0 | 2.5 | — |
| reference example 12 | zirconium | 39.5 | 96.9 | 41500 | 40214 | 5 | 2.2 | — |
| reference example 13 | zirconium | 50.0 | 95.5 | 41500 | 39633 | 3 | 2.3 | — |
| comparative example 13 | zirconium | 55.0 | 95.6 | 41500 | 39674 | 57 | 2.3 | — |
| comparative example 14 | zirconium | 162.0 | 100.0 | 41500 | 41500 | 83 | 2.1 | — |

TABLE 4-continued

| sample | ceramic particles | unit cross sectional area cm² | unit area ratio % | specific surface area of honeycomb unit m²/L | specific surface area of honeycomb structure S m²/L | weight reduction rate G in thermal shock & vibration test weight % | pressure loss kPa | regeneration efficiency % |
|---|---|---|---|---|---|---|---|---|
| comparative example 15 | alumina + cordierite | 162.0 | 100.0 | 25000 | 25000 | 0 | 2.9 | — |
| reference example 19 | alumina | 11.8 | 89.3 | 42000 | 37506 | 0 | 3.1 | — |
| reference example 20 | alumina | 11.8 | 84.8 | 42000 | 35616 | 0 | 4.3 | — |
| reference example 21 | alumina | 5.0 | 83.5 | 42000 | 35070 | 0 | 4.4 | — |
| reference example 22 | alumina | 5.0 | 86.8 | 42000 | 36456 | 0 | 3.3 | — |

TABLE 5

| sample | silica alumina fiber | | | specific surface area of honeycomb unit m²/L | specific surface area of honeycomb structure S m²/L | weight reduction rate G in thermal shock & vibration test weight % | pressure loss kPa |
|---|---|---|---|---|---|---|---|
| | diameter μm | length μm | aspect ratio | | | | |
| example 1 | 10 | 100 | 10 | 42000 | 39270 | 0 | 2.4 |
| reference example 14 | 5 | 50 | 10 | 42000 | 39270 | 2 | 2.4 |
| reference example 15 | 10 | 20 | 2 | 42000 | 39270 | 8 | 2.4 |
| reference example 16 | 10 | 5000 | 500 | 42000 | 39270 | 4 | 2.4 |
| reference example 17 | 10 | 10000 | 1000 | 42000 | 39270 | 6 | 2.4 |
| reference example 18 | 10 | 20000 | 2000 | 42000 | 39270 | 25 | 2.4 |

TABLE 6

| sample | organic binder type | unit area ratio % | sintering temperature ° C. | specific surface area of honeycomb unit m²/L | specific surface area S of honeycomb structure m²/L | weight reduction rate G in thermal shock & vibration test weight % | pressure loss kPa |
|---|---|---|---|---|---|---|---|
| reference example 23 | alumina sol | 93.5 | 800 | 42000 | 39270 | 0 | 2.4 |
| reference example 24 | sepiolite | 93.5 | 800 | 42000 | 39270 | 0 | 2.4 |
| reference example 25 | attapulgite | 93.5 | 800 | 42000 | 39270 | 0 | 2.4 |
| reference example 26 | — | 93.5 | 1000 | 42000 | 37400 | 20 | 2.4 |

What is claimed is:

1. A honeycomb structure, comprising:

a plurality of honeycomb units bonded together by using a sealing material layer, each of the honeycomb units including a plurality of through-holes separated by a plurality of partition walls and provided in parallel along a longitudinal direction of the honeycomb units;

wherein each of the honeycomb units includes at least ceramic particles, and inorganic fibers and/or whiskers;

an area of a cross section of each of the honeycomb units perpendicular to the longitudinal direction of the honeycomb unit is greater than or equal to about 5 cm² and less than or equal to about 50 cm²; and an outer surface of each of the honeycomb units and the sealing material layer satisfy:

about $0.5 \leq \kappa/d \times (dc/\kappa c + df/\kappa f) \leq$ about 1 where, $\kappa f$ (W/mK) represents a thermal conductivity of the outer surface of each of the honeycomb units, and df (mm) represents a thickness of the outer surface of each of the honeycomb units, $\kappa c$ (W/mK) represents a thermal conductivity of the sealing material layer, and dc (mm) represents a thickness of the sealing material layer, and $\kappa$ (W/mK) represents a thermal conductivity of a combination of the outer surface and the sealing material layer, and d (mm) represents a thickness of the combination of the outer surface and the sealing material layer.

2. The honeycomb structure as claimed in the claim 1, wherein a ratio of a sum of areas of the cross sections of the honeycomb units perpendicular to the longitudinal direction of the honeycomb units to an area of a cross section of the honeycomb structure perpendicular to the longitudinal direction of the honeycomb structure is greater than or equal to about 85%.

3. The honeycomb structure as claimed in the claim 1, wherein a coating material layer is provided on an outer surface of the honeycomb structure.

4. The honeycomb structure as claimed in claim 1, wherein the ceramic particles selected from the group consisting of alumina, silica, zirconia, titanium, cerium, mullite, and zeolite.

5. The honeycomb structure as claimed in claim 1, wherein the inorganic fibers and/or the whiskers selected from the group consisting of alumina, silica, silicon carbide, silica alumina, glass, potassium titanate, and aluminum borate.

6. The honeycomb structure as claimed in claim 1, wherein
   each of the honeycomb units is formed from a mixture of the ceramic particles, the inorganic fibers and/or the whisker, and an inorganic binder; and
   the inorganic binder selected from the group consisting of alumina sol, silica sol, titanium sol, soluble glass, sepiolite, and attapulgite.

7. The honeycomb structure as claimed in claim 1, wherein the honeycomb structure carries catalyst elements.

8. The honeycomb structure as claimed in claim 7, wherein the catalyst elements include one or more of a noble metal, an alkali metal, an alkali-earth metal, and an oxide.

9. The honeycomb structure as claimed in claim 1, wherein the honeycomb structure is used to convert exhaust gas from a vehicle.

* * * * *